Feb. 9, 1932.   J. HERMAN   1,844,887
METHOD OF AND MEANS FOR MEASURING TIME OF
PROPAGATION OF WAVE FRONTS OVER CIRCUITS
Filed Dec. 2, 1927
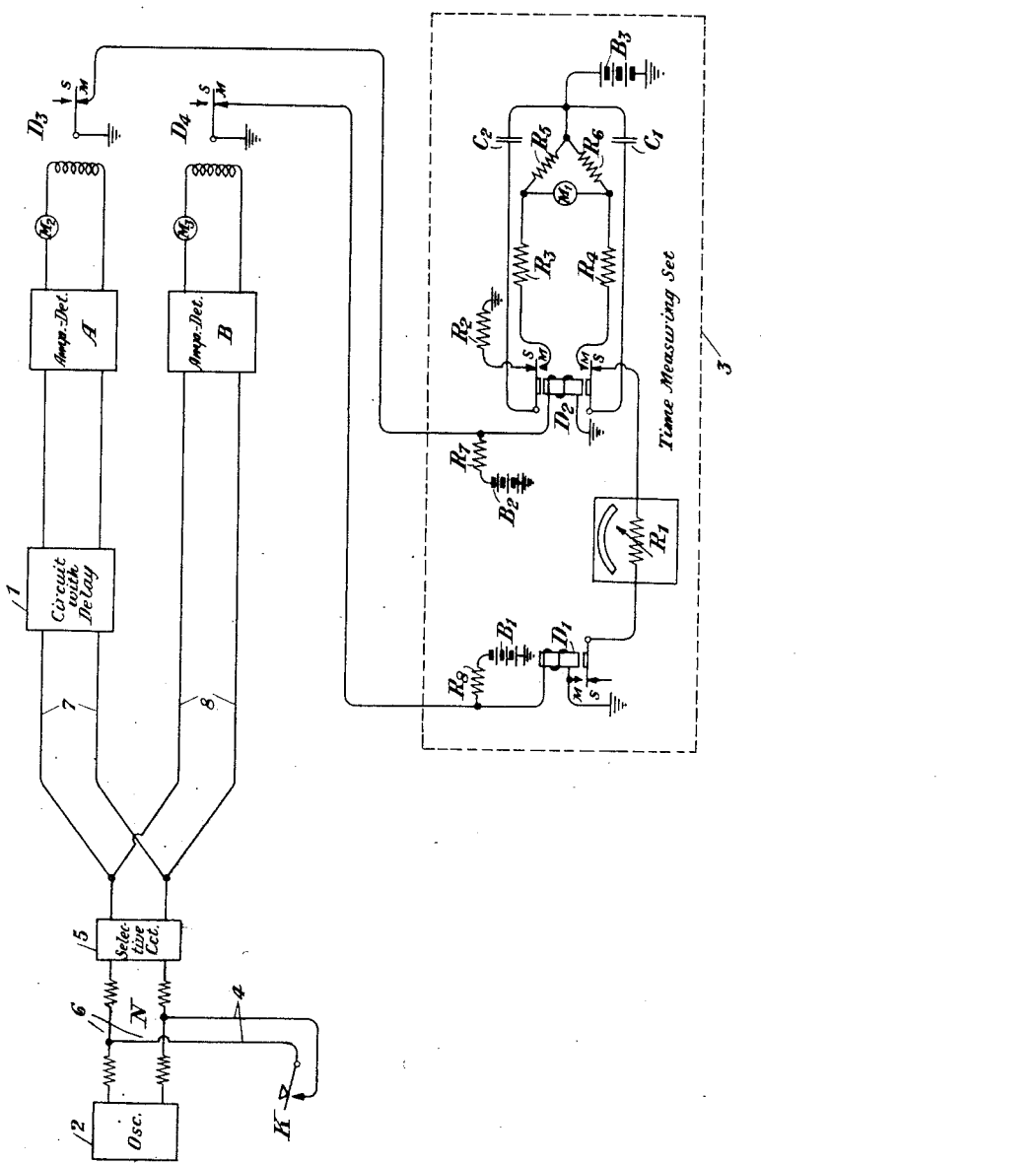
INVENTOR.
J. Herman
BY
ATTORNEY Patented Feb. 9, 1932

1,844,887

UNITED STATES PATENT OFFICE

JOSEPH HERMAN, OF WESTFIELD, NEW JERSEY, ASSIGNOR TO AMERICAN TELEPHONE AND TELEGRAPH COMPANY, A CORPORATION OF NEW YORK

METHOD OF AND MEANS FOR MEASURING TIME OF PROPAGATION OF WAVE FRONTS OVER CIRCUITS

Application filed December 2, 1927. Serial No. 237,301.

This invention relates to methods of and means for measuring the time of propagation of a wave front over a circuit with currents of various frequencies.

An instance wherein measurements of this character might be of value would be in the construction and design of new circuits and more particularly with respect to the design of networks to be utilized in such circuits to equalize the time of propagation thereover of currents of different frequencies. Other uses and features of the invention will appear more fully from the detailed description herinafter given.

The invention utilizes the measuring device disclosed in a patent to J. Herman, No. 1,765,585 of June 24, 1930. In this device the method of operation consists in charging a condenser during the interval of time to be measured, discharging this condenser through an indicating means, such as a differential meter, adjusting the electrical constants of the charging circuit of the condenser by means of a variable resistance, repeating the above operations until the charge accumulated on the condenser is equal to a known charge, and utilizing the values of the electrical constants of the charging circuit when the charge accumulated on the condenser is equal to a known charge to determine the interval of time to be measured. In the arrangements and method of the present invention, current of the frequency to be measured will be applied to or cut off from one end of a known circuit utilized as a standard for calibration purposes. This current will operate a responsive means at the other end of this circuit. The operation of this responsive means will start the charging of the condenser in the measuring set, or in other words, will start the measuring set in operation. Current from the same source will simultaneously be applied to or cut off from a circuit having an unknown delay therein which is to be measured. This current will operate responsive means at the end of this circuit. The operation of this responsive means will control the discharge of the condenser in the measuring set, or in other words, will stop the operation of the measuring set. This process is repeated and the calibrated resistance of the measuring set adjusted until the meter therein shows no deflection. The reading of the measuring set will then indicate an interval of time representing the difference in delay between the two circuits. In other words, it will represent the difference in time of propagation of the wave front over the known circuit and the delay circuit for currents of the particular frequency used in the measurement. For the difference in propagation of wave front at some other frequency, the above procedure must be repeated.

The invention may be more fully understood from the following description together with the accompanying drawing in which is illustrated a circuit diagram embodying a preferred form of the invention.

In the drawing is shown an oscillator 2 connected to a circuit 6. Connected in parallel to the circuit 6 are two circuits 7 and 8. Circuit 7 includes a delay circuit 1 of unknown characteristics, an amplifier-detector A, a meter $M_2$ and the winding of a relay $D_3$. The circuit 8 includes an amplifier-detector B, a meter $M_3$ and the winding of a relay $D_4$. The output of oscillator 2 is connected through a resistance network N to a selective circuit 5. At the resistance N the output of the oscillator 2 is bridged by a circuit 4 which includes the key K. The operation of the key K will short-circuit the output of the oscillator 2. The selective circuit 5 has a narrow band with and is used to suppress harmonics generated by the operation of the key K. A time measuring set 3 similar to that disclosed in the aforementioned copending application in the name of J. Herman, is shown. This set consists of a relay $D_1$ which controls a charging circuit for condenser $C_1$ through the variable resistance $R_1$. Relay $D_1$ is controlled by the relay $D_4$. The time measuring set 3 is provided with another relay $D_2$. This relay is controlled by relay $D_3$ and serves to discharge the condensers $C_1$ and $C_2$ through the differential meter $M_1$.

The method of operation of the arrangements of the invention is as follows: Current from the oscillator 2 will normally be applied to circuit 6 and thence over circuits 7 and 8. Amplifier-detectors A and B will be adjusted so that for a particular set of measurements the reading of meters $M_2$ and $M_3$ will be the same. This steady current from the oscillator 2 will hold the armatures of relays $D_3$ and $D_4$ to their M contacts and accordingly will maintain normally closed short-circuits about the windings of relays $D_1$ and $D_2$ of the measuring set. The key K will now be operated and the short-circuit will be closed across the output of oscillator 2. This will cause the ultimate release of relays $D_3$ and $D_4$. Due to the fact that there is included in circuit 7 the circuit 1 with the unknown delay to be measured, relay $D_4$ will release first. This will remove the short-circuit around the winding of relay $D_1$ and allow this relay to operate. The operation of relay $D_1$ will close a charging circuit through the variable resistance $R_1$ for the condenser $C_1$. After a certain interval from the release of relay $D_4$, the relay $D_3$ will release. This will remove the short-circuit normally existing around the winding of relay $D_2$ and allow the relay $D_2$ to operate. This will discharge condensers $C_1$ and $C_2$ through the differential meter $M_1$. If the charges on condensers $C_1$ and $C_2$ are equal, no deflection will be noted on the meter $M_1$. If the charges are unequal, a deflection will be noted and accordingly the resistance element $R_1$ will be varied. The key K will then be operated again and the above process repeated until no deflection is noted on the meter $M_1$. The reading on the scale associated with resistance $R_1$ will then afford a measurement of the time interval between the operation of relays $D_4$ and $D_3$. Obviously, this interval would represent the difference in time of propagation of the wave front over the circuits 7 and 8. As these circuits are substantially the same except for the fact that delay circuit 1 is included in circuit 7, this measurement of the time measuring set will represent the delay in circuit 1.

While the arrangements of the invention have been disclosed as embodied in certain specific arrangements which are deemed desirable, it is understood that they are capable of embodiment in many and other widely varied forms without departing from the spirit of the invention as defined by the appended claims.

What is claimed is:

1. In combination, a time measuring set having means to start said set into operation and means to stop the operation of said set together with means to give a direct indication of the time interval between said starting and stopping operations, a circuit having a current source of definite frequency associated with one end thereof, means to start and stop the application of current from said source to said circuit, two similar paths connected in parallel with said circuit, responsive means at the end of each of said paths, an element of unknown delay included in one of said paths, means controlled by the responsive means in one of said paths for starting said measuring set in operation, and means controlled by the responsive means associated with the other of said paths for stopping the operation of said measuring set, the indicated interval between said starting and stopping operations being the time of transmission through said element of unknown delay.

2. The method of measuring the difference in time of propagation of a wave front over a known circuit and a circuit having an unknown delay, which comprises starting and stopping the transmission of current of a definite frequency to said known circuit to operate responsive means at the end of said circuit, simultaneously applying current from the same source to said circuit having an unknown delay to operate responsive means at the end of said circuit, utilizing one of said responsive means to start a time measuring set in operation, and utilizing the other of said responsive means to stop the operation of said time measuring set, the indicated interval between said starting and stopping operations being the time of transmission through said circuit of unknown delay.

3. In combination, a time measuring set having means to start said set into operation and means to stop the operation of said set together with means to give a direct indication of the time interval between said starting and stopping operations, a known circuit, means to start and stop the application of current of a certain frequency to said known circuit, responsive means at the end of said circuit, a circuit electrically similar to said first mentioned circuit having included therein an element of unknown delay to be measured, means to control the application of current of the same frequency as said first circuit to said second circuit simultaneously with said first circuit, responsive means at the end of said second circuit, means controlled by the responsive means of one of said circuits to start the time measuring set into operation in response to the control of the application to said circuit of current of a given frequency, and means controlled by the other responsive means to stop the operation of said time measuring set in response to a simultaneous control of the application of current of the same frequency to the other circuit, the indicated interval between said starting and stopping operations being the time of transmission through said element of unknown delay.

In testimony whereof, I have signed my name to this specification this 1st day of December, 1927.

JOSEPH HERMAN.